United States Patent [19]
Schmidt et al.

[11] Patent Number: 5,521,785
[45] Date of Patent: May 28, 1996

[54] ELECTRICAL DRIVING UNIT

[75] Inventors: Ernst Schmidt, Ismaning, Germany;
Urs Portmann, Villars-sur-Glane,
Switzerland; Bernhard Buselmeier,
Oberschleissheim, Germany

[73] Assignees: Bayerische Motoren Werke AG,
Munich, Germany; SAIA AG, Schweiz,
Switzerland

[21] Appl. No.: 291,947

[22] Filed: Aug. 17, 1994

[30] Foreign Application Priority Data

Aug. 17, 1993 [DE] Germany .......................... 43 27 584.2

[51] Int. Cl.$^6$ .................................................. H05H 7/20
[52] U.S. Cl. .......................... 361/720; 361/707; 361/715; 361/722
[58] Field of Search .................... 361/704, 707, 361/715–722, 728, 730, 736–737, 748, 752, 785, 713

[56] References Cited

U.S. PATENT DOCUMENTS

| | | | |
|---|---|---|---|
| 4,409,641 | 10/1983 | Jakob et al. .............................. | 361/720 |
| 4,660,124 | 4/1987 | Woy ........................................ | 361/722 |
| 4,879,630 | 11/1989 | Boncard et al. ........................ | 361/720 |
| 5,060,113 | 10/1991 | Jacobs .................................... | 361/721 |
| 5,140,500 | 8/1992 | Klein et al. ............................. | 361/722 |

FOREIGN PATENT DOCUMENTS

| | | | |
|---|---|---|---|
| 281797 | 11/1990 | Japan ..................................... | 361/722 |
| 1587856 | 4/1981 | United Kingdom ................... | 361/720 |

*Primary Examiner*—Gregory D. Thompson
*Attorney, Agent, or Firm*—Evenson, McKeown, Edwards & Lenahan

[57] ABSTRACT

A central carrier, which is constructed as a stamped part or a metallized plastic part is used for the mutual electrical and mechanical connection of the other components of the system. A plastic material and molded part is sprayed around the carrier. In turn, this molded part holds together the carrier which, after the plastic was sprayed around it, was divided into electrically insulated conductor parts, and which molded part forms housing walls as well as a plug casing.

5 Claims, 3 Drawing Sheets

ELECTRICAL DRIVING UNIT

BACKGROUND AND SUMMARY OF THE INVENTION

The present invention relates to an electrical driving unit having a motor and a control system connected with it.

It is known to equip electrical driving units individually with a control system which normally comprises a microprocessor in order to subject the driving unit to remote control. It is an object of the present invention to simplify such a driving unit with respect to its construction and manufacturing and to therefore produce it at lower cost.

This and other objects are achieved by the present invention which provides an electrical driving unit having a motor and a control system connected with the motor, and electrical and mechanical components, wherein the control system has a carrier which simultaneously forms electrical connections and a carrying structure for the electrical components and the mechanical components coupled to the carrier.

Other objects, advantages and novel features of the present invention will become apparent from the following detailed description of the invention when considered in conjunction with the accompanying drawings.

DETAILED DESCRIPTION OF THE DRAWINGS

Figure 1:
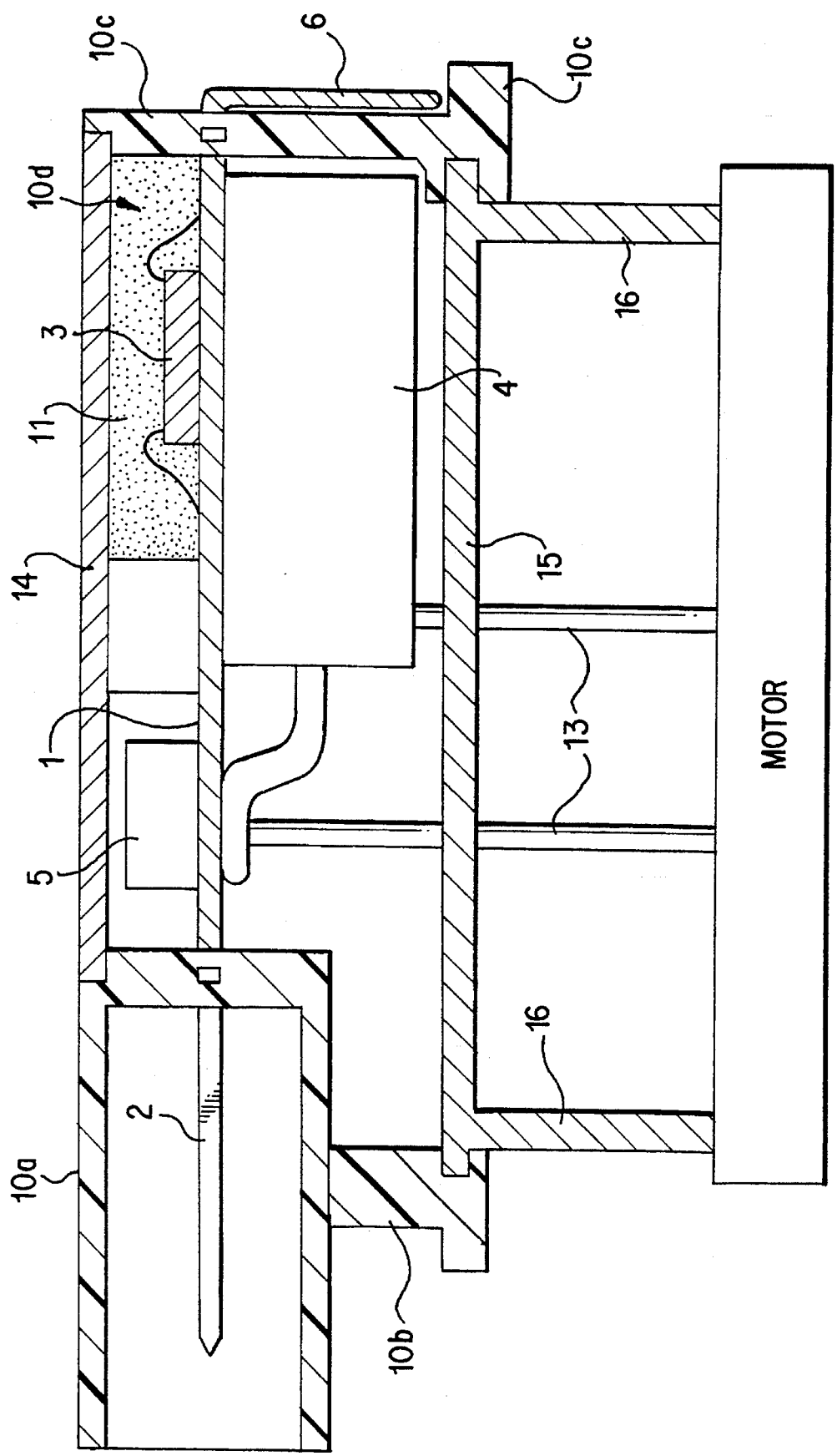
FIG. 1 is a sectional view of the control system of a driving unit constructed in accordance with an embodiment of the present invention.

The control system of the driving unit has a carrier 1 which is constructed as a stamped metal part made of copper sheet of a thickness of, for example, 0.6 mm. This carrier 1 is simultaneously used as a mechanical carrier of the other parts and as an electrical conductor for the internal and external connections of the system. Thus, the carrier has, for example, three plug contacts 2 which are conventionally tinned and are used for the connection of a cable which is not shown. Electrical components, such as an integrated circuit 3, an oscillating element 4 and a capacitor 5 are mechanically and electrically connected with the carrier 1. A bent flange 6 of the carrier 1 may be used as a cooling element.

Figure 2:
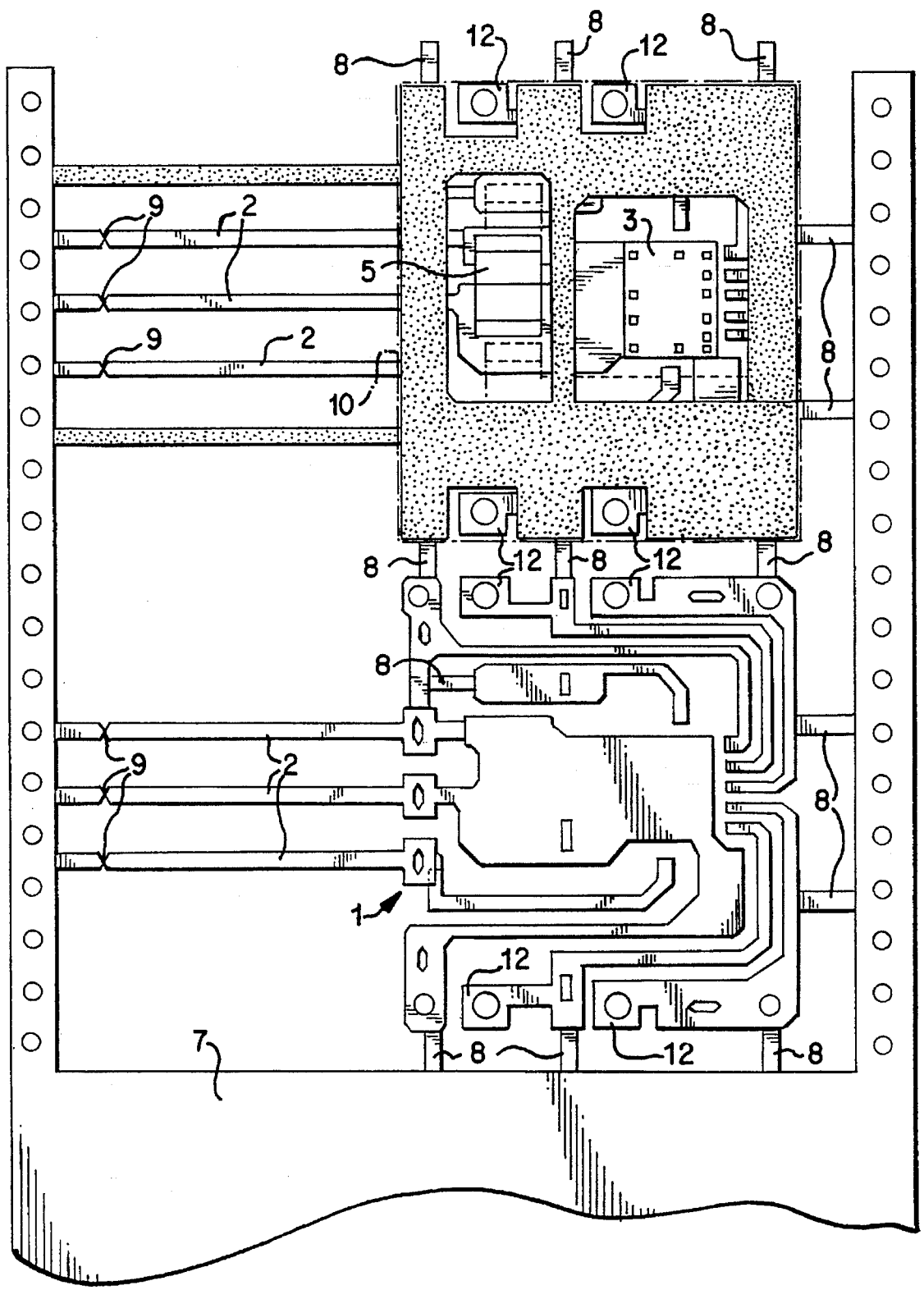
FIG. 2 is a view of the stages of a manufacturing process according to the present invention.

FIG. 2 illustrates an exemplary embodiment according to the invention as to how the carrier 1 may be manufactured and constructed. By means of a stamping tool, the carrier 1 is cut out of a band 7 in the shape illustrated on the bottom in FIG. 2. In this stage, all parts of the carrier 1 are still connected with one another; and bridges 8 are shown in FIG. 2 which are later removed in order to form individual strip conductors which are electrically separated from one another. These strip conductors are partly provided with cut-out holes into which plastic material will later penetrate in a manner which will be explained below in order to connect the components with one another and to hold them in a suitable mutual position. Via predetermined breaking points 9, the plug contacts 2 are also connected with the metal band but are later separated there in order to electrically separate the plug contacts 2 from one another.

In a next manufacturing step illustrated on the top in FIG. 2, plastic is sprayed around the carrier 1, specifically along the contours indicated by dash-dotted lines 10 on FIG. 2, in such a manner that connecting points for the electrical components remain free. These components will then be inserted and soldered or bonded in the manner illustrated in FIG. 2.

As illustrated in FIG. 1, the plastic molded part 10 forms, among other parts, a plug casing 10a, housing walls 10b and 10c as well as a recess 10d into which a casting compound 11 is injected for the integrated circuit 3. Connecting lugs 12 are used, for example, for connecting two connecting wires 13 respectively of an electric motor (schematically shown), for example, a step motor with two windings. A cover 14 and a bottom 15 are connected, for example, snapped in or welded, with the plastic molded part 10. The bottom 15 is provided with fastening flanges 16 for the mechanical connection with the motor of the driving unit.

Instead of a stamped part, a flat carrier made of an insulating material, such as plastic, may also be provided as the carrier which is provided on both sides with the required strip conductors and possible electrical cross connections. Plastic is then correspondingly also sprayed around this carrier, on which the electrical components are mounted, are compound-filled, as required; and the housing is then closed by means of the cover and the bottom. In this construction, the cover 14 and/or the bottom 15 are metallized in certain embodiments in order to achieve sufficient cooling and shielding.

Figure 3:
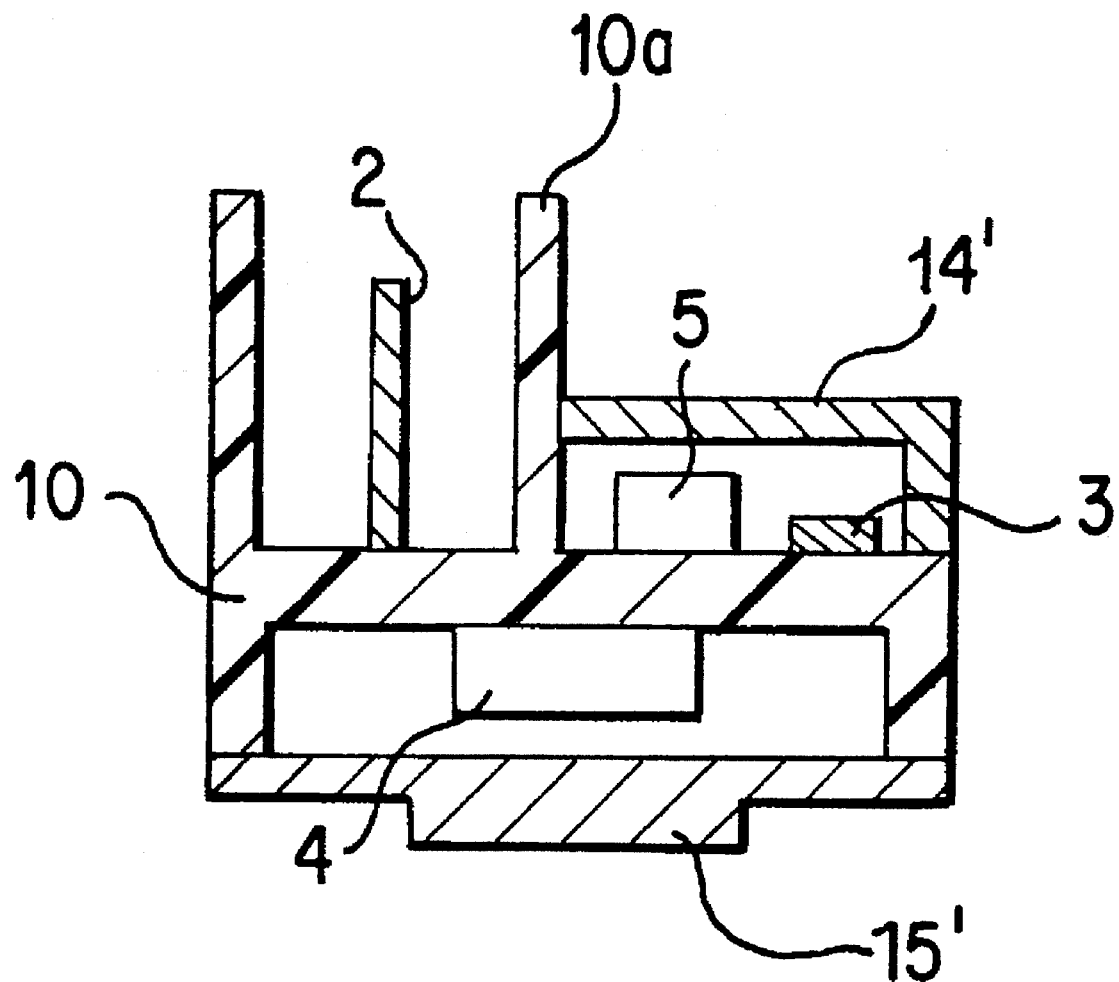
FIG. 3 is a view of another embodiment of the present invention.

FIG. 3 is a purely schematic view of a construction variant in which corresponding components have the same reference numbers as in FIGS. 1 and 2. The difference is that the plug contacts 2 are transverse to the remaining portion of the carrier 1. Correspondingly, cover 14' and cover 15' have a slightly different shape.

In certain embodiments, the cover 14 and/or the bottom 15 are also connected with suitable parts of the carrier 1 which project from the plastic molded part 10.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An electrical driving unit having a motor, a control system connected with the motor, electrical components, and mechanical housing components, wherein the control system comprises a carrier simultaneously integrally forming electrical connections and a carrying support structure for said control system, said carrying support structure directly supporting the electrical components and supporting the mechanical housing parts surrounding the electrical components;

wherein said control system further comprises a plastic material sprayed around the carrier to form a plastic molded part of the mechanical housing parts, said mechanical housing parts further including a cover and a bottom that are connected with at least one of the plastic molded parts.

2. A unit according to claim 1, wherein the carrier is a massive metal carrier.

3. A unit according to claim 1, wherein the carrier further integrally includes cooling element portions outside of the mechanical housing parts.

4. A unit according to claim 1, wherein the plastic molded part includes a formed plug casing in which at least some of the electrical connections of the carrier are situated, the electrical connections being plug contacts.

5. A unit according to claim 1, wherein the carrier is made of insulating material and comprises strip conductors formed in the insulating material.

* * * * *